(12) United States Patent
Perovic

(10) Patent No.: US 8,371,255 B2
(45) Date of Patent: Feb. 12, 2013

(54) TWO STROKE ENGINE WITH REGULAR LUBRICATION SYSTEM

(76) Inventor: Srdjan Perovic, Ottawa (CA)

(*) Notice: Subject to any disclaimer, the term of this patent is extended or adjusted under 35 U.S.C. 154(b) by 782 days.

(21) Appl. No.: 12/495,764

(22) Filed: Jun. 30, 2009

(65) Prior Publication Data
US 2010/0326411 A1 Dec. 30, 2010

(51) Int. Cl.
*F02B 25/00* (2006.01)
(52) U.S. Cl. .............. 123/65 BA; 123/65 VB; 123/69 V
(58) Field of Classification Search ............... 123/69 R, 123/69 V, 65 A, 65 B, 65 BA, 65 VB, 65 VD
See application file for complete search history.

(56) References Cited

U.S. PATENT DOCUMENTS

| | | | | | |
|---|---|---|---|---|---|
| 3,093,959 | A | * | 6/1963 | Birmann | 123/65 BA |
| 4,162,662 | A | * | 7/1979 | Melchior | 123/65 BA |
| 5,819,693 | A | * | 10/1998 | Curtil | 123/65 BA |
| 6,647,724 | B1 | * | 11/2003 | Arnold et al. | 60/608 |

* cited by examiner

*Primary Examiner* — Noah Kamen

(57) ABSTRACT

The invention is a two-stroke engine that incorporates advantages of both the two-stroke and four-stroke types of engines. The crankcase is sealed and uses an oil pump to lubricate the piston, connecting rod, and crankshaft. The combustion air does not flow through the crankcase. Instead, the engine uses two camshafts, one for the intake valve located on the cylinder head and the other for the exhaust valve located on the side of the cylinder. The engine has a compressor, powered by the engine battery to compress ambient air before it enters into the combustion chamber. Additionally, the engine has an exhaust powered turbine connected to an alternator, which provides additional power for the engine battery. The engine is equipped with one or plurality of fuel-injection nozzles. The piston is of the two step type, which reduces friction between the piston and the cylinder.

8 Claims, 5 Drawing Sheets

TWO STROKE ENGINE WITH REGULAR LUBRICATION SYSTEM

BACKGROUND OF THE INVENTION

Previous two stroke engines deliver intake air through the crankcase to the combustion chamber by the pumping action of the piston. Generally, lubricating oil is mixed with the intake air so as to lubricate the crankshaft and piston. The result is increased oil consumption and emissions compared to a conventional four stroke engine. There are two stroke engines with sealed crankcases. However, these have both the intake and exhaust valves in the cylinder head with the result of increased problems of scavenging the products of combustion. The present invention solves the scavenging problem by locating the exhaust valve proximate bottom dead center for lengthwise scavenging and solves the oil consumption problem by sealing the crankcase with a step type piston. The step piston having piston rings located only at a bottommost portion and a body portion defining the rest of the piston wherein it is spaced from the cylinder wall.

BRIEF SUMMARY OF THE INVENTION

This is a new design for two stroke engines that incorporates advantages of both the two-stroke and four-stroke types of engines. The engine is lubricated exactly like a four-stroke engine; it has piston rings that lubricate the piston and the cylinder, i.e. the oil control ring, as well as all the customary lubricating parts such as the oil pan with the oil pump and the oil distribution system. The engine uses two camshafts, one for the intake valve and the other for the exhaust valve. The engine has a compressor, powered by the engine battery to compress ambient air before it enters into the combustion chamber. Additionally, the engine has an exhaust powered turbine connected to an alternator, which provides additional power for the engine battery. The engine is equipped with one or plurality of fuel-injection nozzles. The piston is of the two step type, which reduces friction between the piston and the cylinder. The operation of the engine is controlled by a computer, the Engine Control Unit (ECU).

| Element Number | Description |
| --- | --- |
| ~1 | Injector connected to ~80 (ECU) |
| ~72 | Ambient air inlet |
| ~71 | Compressor |
| ~73 | Compressed air chamber |
| ~74 | Compressed air pipe |
| ~77 | Electric motor connected to ~80 (ECU) |
| ~80 | Engine Control Unit (ECU) |
| ~81 | Pressure sensor connected to element ~80 (ECU) |
| ~46 | Intake valve |
| ~41 | Intake camshaft |
| ~45 | Intake cam |
| ~40 | Piston |
| ~82 | rpm sensor |
| ~60 | Exhaust turbine |
| ~61 | Alternator connected to element ~80 (ECU) |
| ~56 | Exhaust valve |
| ~55 | Exhaust cam |
| ~51 | Exhaust camshaft |
| ~10 | Cylinder body |
| ~12 | Compression area |

Figure 4:
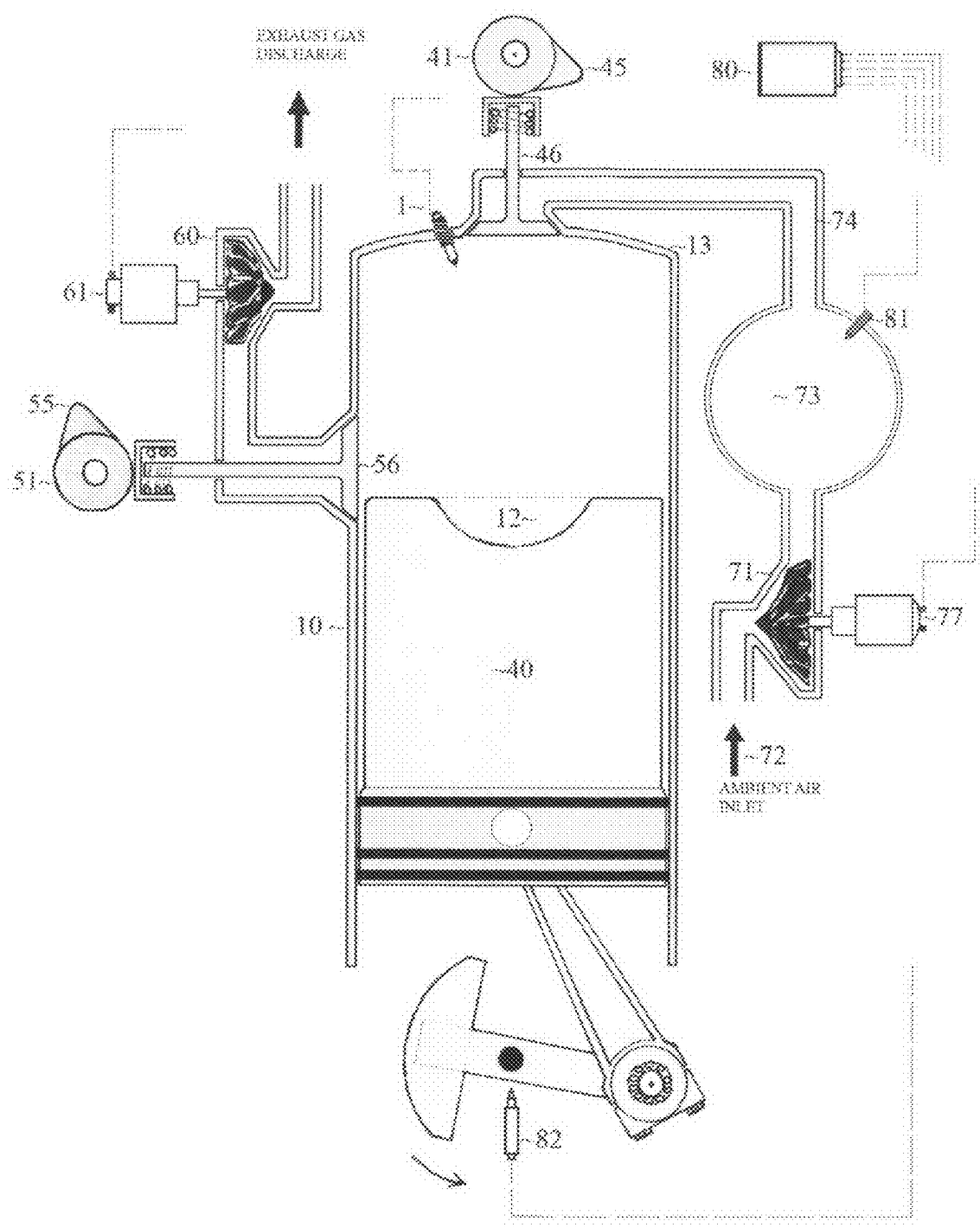
Figure 5:
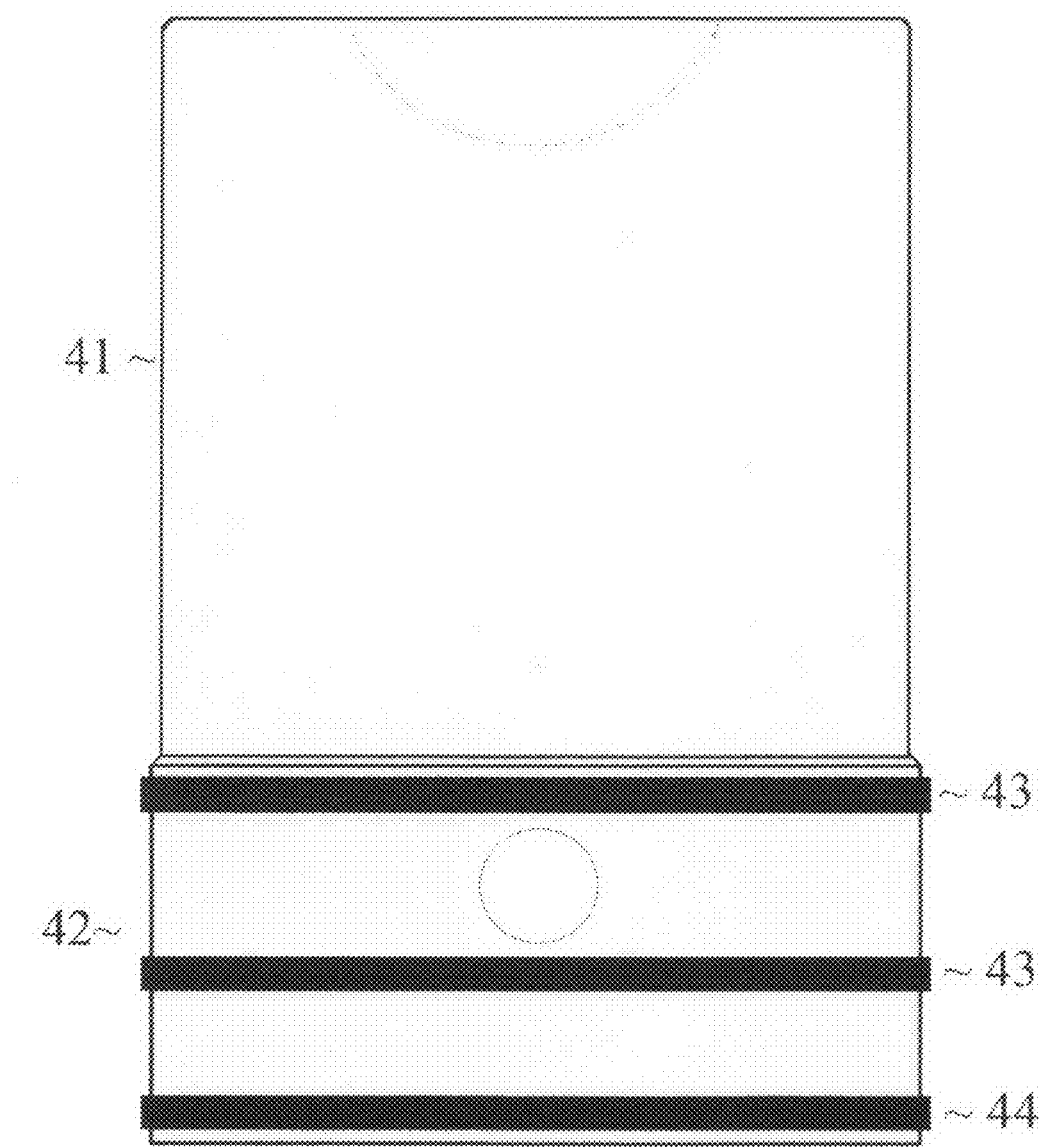

FIG. 5 is a cutaway view of the piston which fits inside the cylinder (FIG. 1 ~10). Element ~42 is the lower part of the piston and consists of three rings shown as elements ~43 and ~44. Element ~41 is the upper part of the piston.

DETAILED DESCRIPTION OF THE INVENTION

Figure 1:
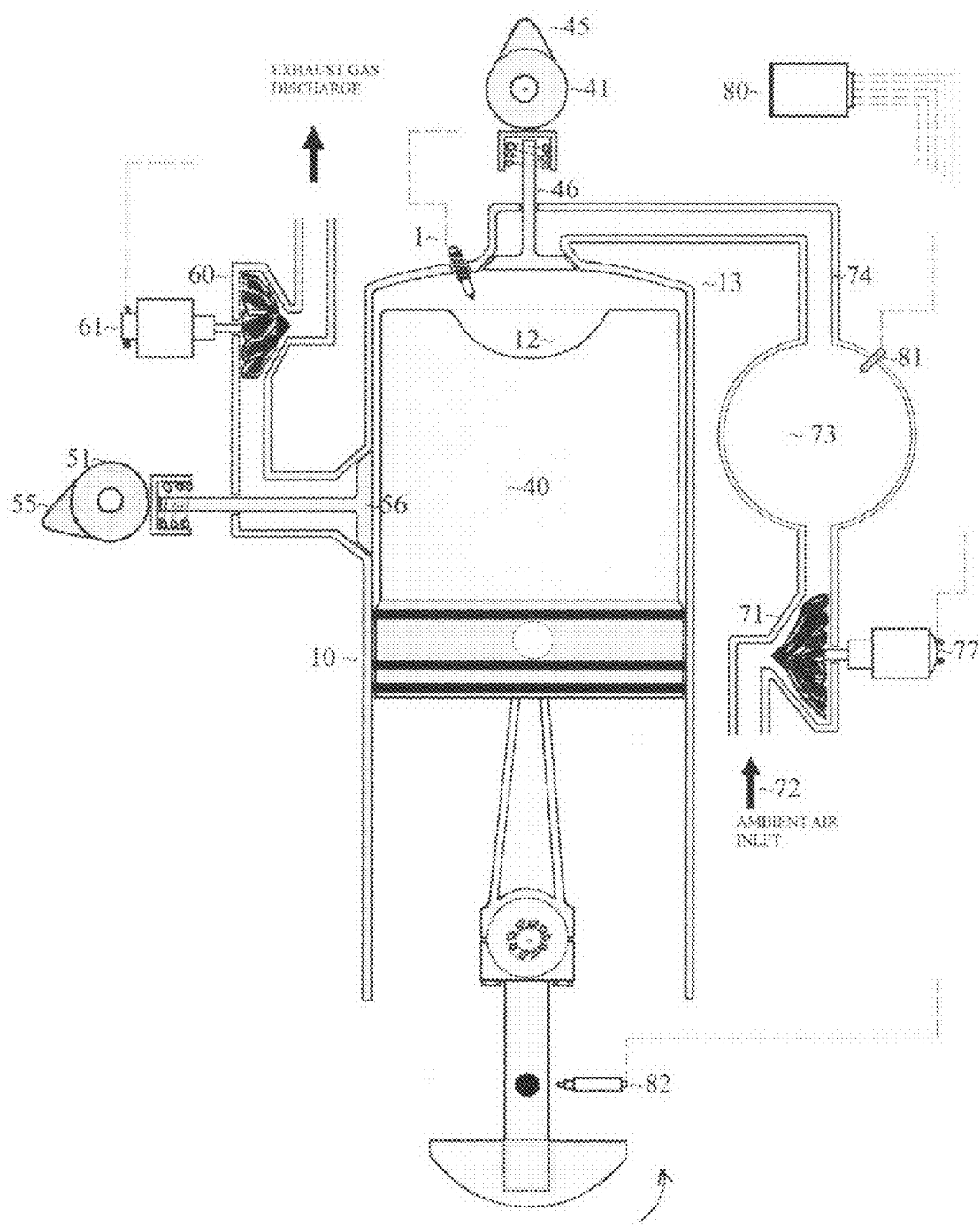
FIG. 1, FIG. 2, FIG. 3, and FIG. 4 are cutaway views of the engine design; they all have the same elements, numbered the same, with the only difference being in the position of the moving parts. Therefore, element descriptions are the same for FIG. 1, FIG. 2, FIG. 3 and FIG. 4, which are as follows.
Figure 2:
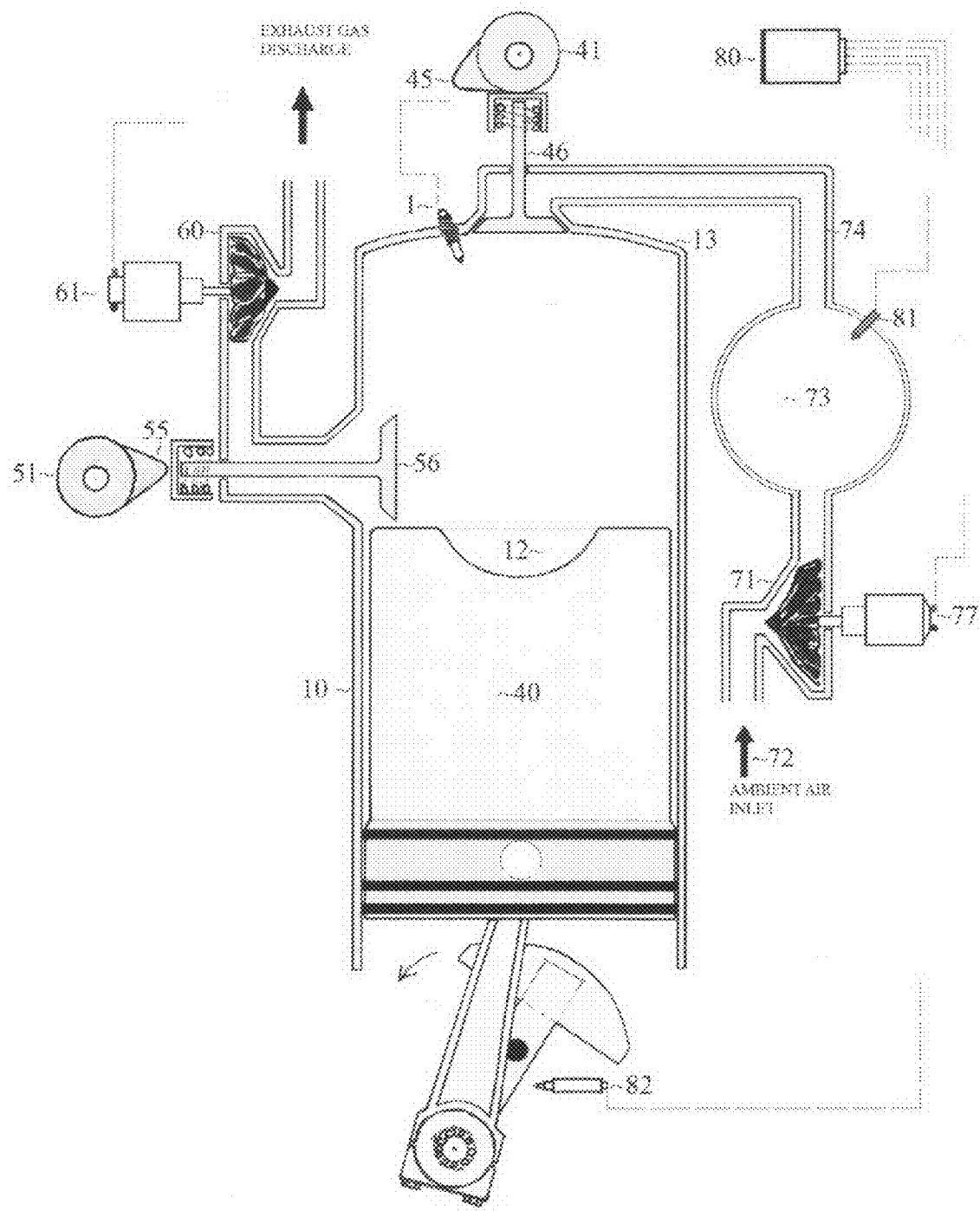
Figure 3:
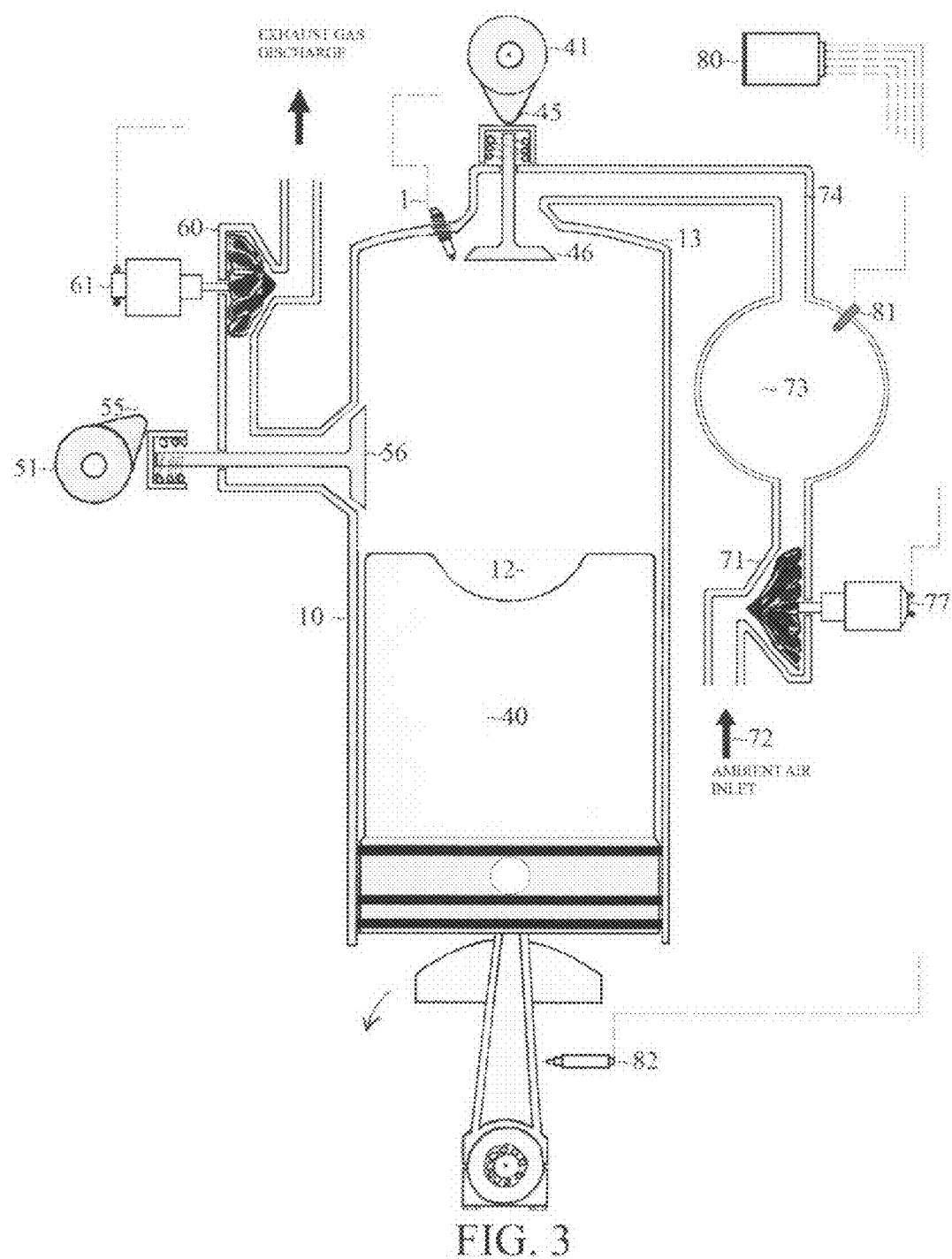

The cycle begins when the ignition key is turned to the start position and the electric motor (FIG. 1. ~77) starts to drive the compressor (FIG. 1. ~71) which drives the fresh ambient air into the compressed air chamber (FIG. 1. ~73). The pressure sensor (FIG. 1. ~81) delivers the information to the ECU (FIG. 1. ~80) which, when the pressure in the compressed air chamber (FIG. 1. ~73) reaches a certain defined amount, turns the engine over, thereby starting the operation of the engine. Initially, the start phase lasts a few seconds, but in subsequent engine starts, that phase is shorter as there is already some pressure in the compressed air chamber (FIG. 1. ~73). Compressed ambient air enters the cylinder (engine is turning), in the top piston position the intake and the exhaust valves are closed and the pressure necessary for ignition is achieved. The injector (FIG. 1. ~1) injects the fuel into the compression area (FIG. 1. ~12) and the air-fuel mixture is ignited. Pressure pushes the piston (FIG. 1. ~40) down. Just before the piston reaches the bottom position, the exhaust valve (FIG. 2. ~56) is opened, exhaust gases leave the cylinder driving the exhaust turbine (FIG. 2. ~60), which in turn drives the alternator (FIG. 2. ~61) that charges the battery, which, in turn, is mostly used to run the electric motor (FIG. 2. ~77) and the compressor (FIG. 2. ~71). A moment later, but still before the bottom piston position, the intake valve (FIG. 3. ~46) is opened. Ambient air enters the cylinder but exhaust valve vent (FIG. 3. ~56) is still opened for a brief moment so that last remaining exhaust combusted mix is pushed out with some of the fresh ambient air. Exhaust valve vent (FIG. 3. ~56) closes at the bottom position of the piston and as the piston moves up the intake valve (FIG. 4. ~46) closes as well, allowing the piston to compress the fresh ambient air into the compression area (FIG. 4. ~12). This cycle repeats indefinitely while engine operates. The ECU continuously monitors the rpm through an rpm sensor (FIG. 4. ~82), pressure in the air compression chamber (FIG. 4. ~73) through a pressure sensor (FIG. 4. ~81), and the charge level in the battery thereby creating optimal conditions for engine operation.

The piston has a unique form: the lower part has rings (FIG. 5. ~42) that lubricate and seal the piston to the cylinder, while the upper part above the rings (FIG. 5. ~41) is slightly narrower than the cylinder, and it that upper part it never touches the cylinder walls. The size of the volume of the upper part is intended to provide for enough pressure in the combustion chamber. The wrist pin could be placed in the upper part of the piston (FIG. 5. ~42), which would allow for a shorter engine.

There is an alternative, cheaper variant, which like a traditional two-stroke engine brings air into the crankcase. The advantage of this variant is that it would not need a compressed air chamber (FIG. 1 ~73), and the compressor (FIG.

1 ~71) and the exhaust turbine (FIG. 1 ~60) would be smaller and cheaper. The disadvantages are that a more expensive form of lubrication, such as dry-sump, would be necessary, and that the overall engine operation would be less efficient, leading to higher operating costs.

The traditional lubrication system used in four-stroke engines has proven to be the most effective solution to the problem of lubricating the moving, mechanical-power generating parts of an internal combustion engine. Until now this system was not available for two-stroke engines. The proposed engine combines the best features of both the two and the four-stroke types of engines: lubrication system is simple and effective as in the four-stroke, the exhaust is clean as in the four-stroke, and for the same displacement the proposed engine would have more than twice the power.

The proposed engine is described above in its diesel version, but with minor modifications it can be made into a gasoline one. The gasoline version would use a direct fuel-injection system (NO carbureted version is possible), and would have a smaller compression ratio.

The invention claimed is:

1. A two stroke internal combustion engine comprising: a cylinder head having an intake valve, a cylinder with an exhaust valve, an intake passage connected to the intake valve and having an electric motor driven compressor for pressurizing the intake air, an exhaust passage connected to the exhaust valve and having a turbine that drives an alternator to produce electricity, and a step type piston that seals the combustion chamber defined by the cylinder and cylinder head from the crankcase, wherein there is lengthwise scavenging from the cylinder head down to the exhaust valve when the piston is proximate bottom dead center.

2. The engine set forth in claim 1 further comprising: camshafts driving the intake and exhaust valves.

3. The engine set forth in claim 1 further comprising: an ECU controlling a fuel injector located in the cylinder head.

4. The engine set forth in claim 3 further comprising: an rpm sensor with a crankshaft driven by said piston and a pressure sensor in a pressure chamber located in the intake passage; the sensors connected to the ECU.

5. The engine set forth in claim 3 wherein: the ECU controls the operation of the compressor and the turbine.

6. The engine set forth in claim 3 wherein: the compression ratio defined by the engine structure is adapted for compression ignition.

7. The engine set forth in claim 1 wherein: the piston has piston rings that never go past the exhaust valve.

8. The engine set forth in claim 1 wherein: the piston covers the exhaust valve except when proximate bottom dead center.

* * * * *